United States Patent

Hubbell, III

[15] 3,654,764

[45] Apr. 11, 1972

[54] PLURAL DIAMETER TUBE

[72] Inventor: Franklin R. Hubbell, III, Brooklyn, Mich.

[73] Assignee: Tenneco Inc., Racine, Wis.

[22] Filed: May 18, 1970

[21] Appl. No.: 38,021

[52] U.S. Cl. ..................................60/324, 138/109, 285/177
[51] Int. Cl. .........................................F01n 7/08, F16l 7/00
[58] Field of Search ..................60/29, 32; 285/177; 138/109

[56] References Cited

UNITED STATES PATENTS

| 1,481,709 | 1/1924 | Hauf | 138/109 |
| 2,799,533 | 7/1957 | Bachli | 285/177 |
| 2,847,820 | 8/1958 | Leach | 60/29 |
| 3,239,251 | 3/1966 | Hills | 60/29 |

FOREIGN PATENTS OR APPLICATIONS 648,214  1/1951  Great Britain..........................138/109

Primary Examiner—Douglas Hart
Attorney—Harness, Dickey & Pierce

[57] ABSTRACT

A double diameter pipe or tube section suitable for use in a motor vehicle exhaust system comprises a large size thin-walled metal pipe that has folds formed in it which extend radially inside the pipe and serve as a means to reduce the cross sectional size of the pipe end and enable it to be connected to a small diameter pipe in the system.

1 Claims, 3 Drawing Figures

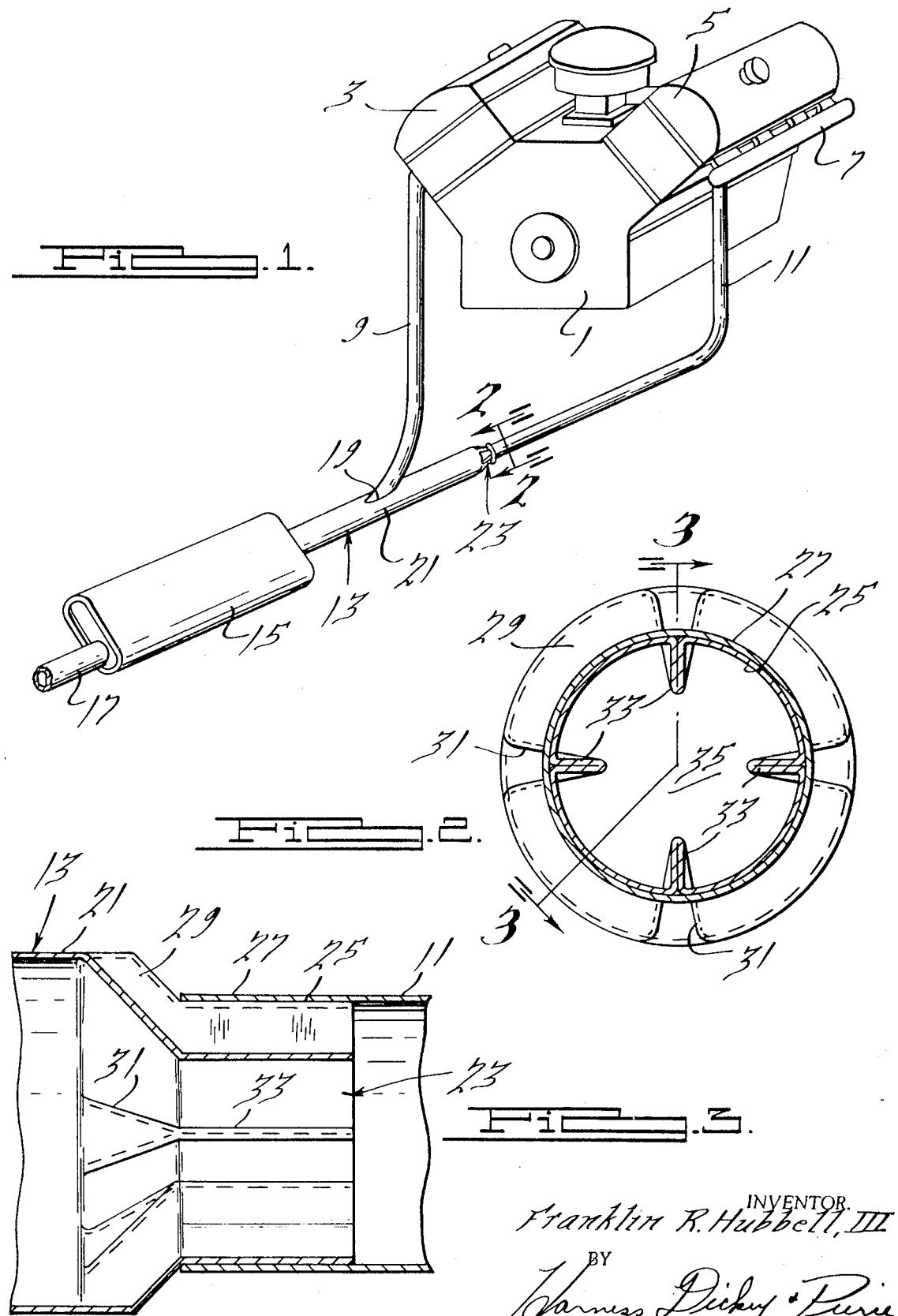

PLURAL DIAMETER TUBE

BRIEF SUMMARY OF THE INVENTION

It is the purpose of this invention to provide a one piece pipe with a large diameter section and also a smaller diameter section that enables the pipe to be telescoped inside of a conduit that is to be connected to it.

The invention accomplishes this by means of a one piece pipe of a large diameter. One end of the pipe has radially extending folds formed in it to take up the metal of the pipe and thereby reduce the diameter of the end. The folds extend inwardly into the passageway formed by the pipe thereby enabling the outer circumference to be formed as a substantially smooth surface that may telescope inside of a conduit that is to be connected to it.

DESCRIPTION OF THE DRAWINGS

FIG. 1 is a perspective view of a V-8 internal combustion engine having an exhaust system utilizing a pipe construction in accordance with this invention;

FIG. 2 is an enlarged section along the line 2—2 of FIG. 1; and

FIG. 3 is a section along the line 3—3 of FIG. 2.

DETAILED DESCRIPTION OF THE INVENTION

The V-8 internal combustion engine 1 has two banks of cylinders 3 and 5 with exhaust manifolds 7. The exhaust gas flow and silencing system for the engine includes exhaust pipes 9 and 11 that carry the exhaust gases from the manifolds to a common pipe 13 which conducts them to an exhaust gas muffler 15 from which they flow to the tailpipe 17 and to atmosphere. The exhaust pipe section 9 empties into an opening 19 in the sidewall 21 of the pipe 13 whereas the pipe 11, which is of the same size as the pipe 9, is co-axial with the pipe 13 and telescopically connected to the end of the pipe 13.

The pipe 13 is materially larger in diameter than the pipe 11 inasmuch as it carries twice the volume; and to enable them to be connected together the end section 23 of the pipe 13 is formed in a special way so that the large diameter portion 21 is connected to a much smaller diameter portion 25 which fits inside the end 27 of the exhaust pipe 11, as best seen in FIGS. 2 and 3. The end 25 of the pipe 13 is connected to the large diameter portion 21 by a tapering section 29.

The tapered section 29 has a plurality, preferably four as shown, of V-shaped folds formed in the thin metal wall of the pipe to extend radially inwardly whereby they taper in a radial direction as well as in a longitudinal direction. In the end section 25 the V-shaped folds 31 are closed up into U-shaped folds 33 having opposite sides that are in face to face contact so that the outer circumference of the pipe end 25 is substantially smooth and continuous thus enabling it to fit readily inside the end 27 of the pipe 11. The total lengths of the folds absorb the reduction in circumference between the larger and smaller cross sections of the pipe.

The folds 31 and 33 by virtue of their position within the passage 35 that is provided by the pipe 13 act to some extent as acoustic elements and flow stabilizers and thereby contribute somewhat to the functioning of the system as a sound attenuator as well as to its useful structure as a connecting means.

Modifications may be made without departing from the spirit and scope of the invention.

I claim:

1. In an exhaust system for an internal combustion engine having two exhaust manifolds, a muffler, a first pipe leading to the muffler, a second pipe connected to a side of the first pipe for connection to one of said manifolds, a third pipe connected to the end of the first pipe for connection to the other of said manifolds, the end of said first pipe having a plurality of folds in the wall thereof and located on the inside thereof and said end being smaller in diameter than the adjacent portion of the first pipe, said third pipe telescopically fitting on the outside surface of said end of the first pipe.

* * * * *